PHOTOSENSITIVE READ-OUT DEVICE FOR APERTURED RECORDS

Original Filed Jan. 4, 1963 2 Sheets-Sheet 1

INVENTORS.
ROBERT L. MALONE
GEORGE W. FLOYD
BY
Christie Parker & Hale
ATTORNEYS.

INVENTORS.
ROBERT L. MALONE
GEORGE W. FLOYD
BY
Christie, Parker & Hale
ATTORNEYS.

United States Patent Office
3,351,765
Patented Nov. 7, 1967

3,351,765
PHOTOSENSITIVE READ-OUT DEVICE FOR APERTURED RECORDS

Robert L. Malone, Palos Verdes Peninsula, and George W. Floyd, Inglewood, Calif., assignors, by mesne assignments, to Ex-Cell-O Corporation, Detroit, Mich., a corporation of Michigan Continuation of application Ser. No. 249,355, Jan. 4, 1963. This application Oct. 31, 1966, Ser. No. 595,299
7 Claims. (Cl. 250—219)

ABSTRACT OF THE DISCLOSURE

A read out device for use in systems for reading information from record members such as punched paper tape.

The read out device is constructed as a unitary assembly of a photoelectric element mounted in a holder with a mask having non-round apertures and a light transmitting member closing the assembly. The non-round aperture, which may be eye-shaped is defined to provide an electrical output signal from the photoelectric element that is of a generally square waveform.

This application is a continuation of the earlier filed application bearing Ser. No. 249,355, filed on Jan. 4, 1963, entitled, Read Out Device, and assigned to the same assignee as the present application.

This invention relates to a read out device and more particularly to improvements in the construction of a read out device for use with record members having light transmitting apertures.

At the present time information, and particularly digital information, is recorded on various recording media. One of the least expensive of these recording media involves the use of a record member wherein information is represented in coded form by means of apertures or light transmitting areas. These record members commonly take the form of a punched card or a punched paper tape. These punched record members are sensed either mechanically or electrically, such as by means of sensing fingers or through the combination of a light source and a light sensitive element respectively. The use of a light sensing element for reading punched paper tape allows very high reading speeds and has been extensively adopted. The basic structure for reading a punched record member by means of a light sensitive cell is to utilize a light source on one side of the record member and a light sensitive element on the other side whereby an output indication is derived from the light sensitive element only when light rays pass through the light transmitting aperture of the record member and impinge on the light sensitive element. This type of operation, then, requires that the record member proper have low light transmitting characteristics so as not to activate the light sensitive element merely due to the light transmitted through the record member proper and thereby produce erroneous output signals or mask the signal derived or the signals provided by the light rays being transmitted through a recorded aperture.

At the present time commercially available photocell readers are arranged with a collimation block positioned between the light source and the light sensing element for collimating the light rays transmitted through a recorded aperture positioned within a particular area on the record member and to direct the individual light rays to a corresponding light sensitive element positioned immediately below the collimation plate to cause the light rays to impinge on the light element at a normal thereto. The use of such an arrangement required that the collimation apertures in the block be precision drilled and also that the apertures be located precisely with regard to the active area of a photocell to attempt to restrict the light rays from a particular aperture to impinge only on a light element individual to the apertures having the same physical location on the record member. Stated differently, the collimation apertures were generally round and the centers of the collimation apertures had to be located to place them in axial alignment with the centers of the active areas of the photocells. Furthermore, the light sensing element and the collimation block must be positioned as close together as possible.

The use of such an arrangement has not been altogether satisfactory, particularly when the basic requirements of the output indications from the read out device are considered. To this end, the read out device should provide an output indication that has a wave shape that is substantially square as a function of the motion of the record member past the sensing element. The output indication, which may be a current signal when a photovoltaic cell is employed, should be as large as possible for a given amount of incident illumination. Furthermore, the light rays should be so collimated that the effect of cross talk is minimized or the illumination of a cell is not dependent upon the illumination derived from an adjacent area on the record member but should preferably be only a function of the normal incident illumination and the individual cell sensitivity. The ability of the collimation apertures to transmit light rays is reduced as the length of the column increases and as the brightness of the column decreases. This would lead to the conclusion that a thin bright aperture is desirable from the standpoint of the amplitude of the output signal derived from the photocell but has been found to lead to cross talk. Such a collimation block requires that it be structurally rigid whereby the thinness of the block is limited. This ability to reject cross talk is also related directly to the geometry of the bottom surfaces of the record member or paper tape with respect to the active area of the cells and any intervening elements.

The present invention provides an improved read out device constructed as a unitary read out assembly adapted for reading punched record members in the form of paper tape that solves the aforementioned problems of the prior art and eliminates the physical and manufacturing difficulties encountered in producing a record reader employing these prior art teachings. The read out device is constructed to allow the light sensitive element to be fully activated for approximately fifty percent of the time interval a recorded aperture is passing over the light sensitive element and produces a usable output indication in the general form of a square output waveform even with record members that are constructed of a material that is forty percent light transmitting.

From a structural standpoint, the read out assembly comprises a light sensitive element, that may be a photovoltaic cell, for producing electrical output indications in response to a light signal impinging thereon by means of a recorded light transmitting aperture on the record member. The light cell is mounted in a holder to expose the light active area thereof and is mounted within a thin mask having a non-round light transmitting aperture for exposing a preselected portion of the light exposed active area of the cell to provide an output indication having a substantially square waveform and a preselected amplitude. A light transmitting member is then mounted in the holder over the mask to function as a closure for the holder and to form a unitary sensing assembly whereby a record member may be passed directly over the light transmitting member of the read out device.

These and other features of the present invention may be more fully appreciated when considered in the light of the following specification and drawings, in which:

FIG. 7 is a top plan view of a pair of apertures arranged in a typical side-by-side relationship on a record member and having the non-round apertures superimposed thereon in cross-hatched fashion.

Figure 1:
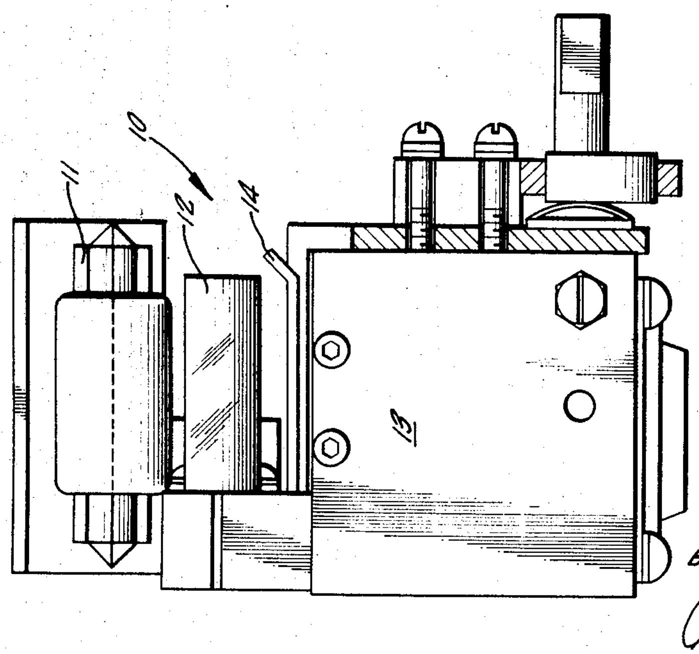
FIG. 1 is a side elevational view of a typical record reader embodying the invention.
Figure 1:
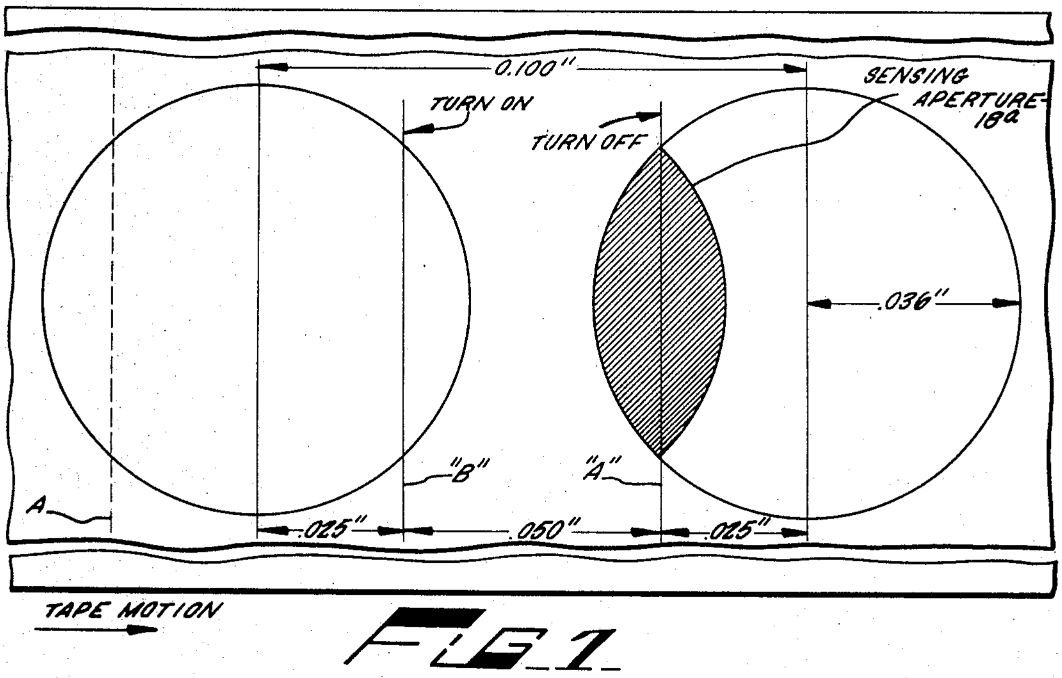
Figure 5:
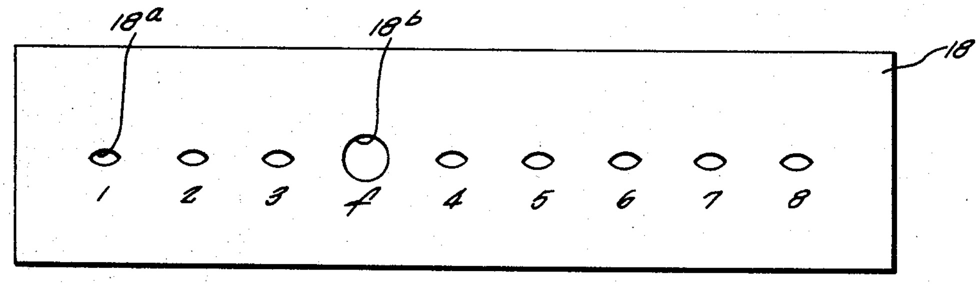
FIG. 5 is a top plan view of the detached mask for the read out device of FIGS. 2–4.

Now referring to FIG. 1 the general organization of a record reader and more particularly a paper tape reader will be examined. The record reader 10 includes a light source comprising a lamp 11 and spaced from a cylindrical lens 12 for distributing the light onto the read out device proper. The lamp 11 may be constructed as a single filament lamp wherein the filament comprises a thin wire extending longitudinally of the lamp envelope. The read out device 15 is mounted in the top surface of a read out block 13 over which the record member is passed. The record member is passed between the light source and more particularly the lens 12 and the read out device 15. As illustrated in FIG. 1, the record member is maintained in engagement with the read out device 15 by means of a retaining elment 14 which may be constructed as a spring clip mounted between the lens 12 and the block 13. As is well known, the passage of the record member over the read out device allows it to sense the recorded apertures to produce output indications corresponding to each of the recorded apertures on the record member.

The read out device 15 is arranged to sense a conventional paper tape wherein the information is recorded in separate columns, for example eight information columns and a single timing channel wherein the sprocket holes are recorded.

The read out device 15 comprises a holder 16 for mounting a light sensitive element 17 therein and a thin mask 18 is positioned within the holder 16 over the active area of the light sensitive element 17 along with a light transmitting element 19 positioned in engagement with the mask 18 and further functioning as a closure for the holder 16 to form a unitary read out assembly. The mask 18 is provided with a non-round aperture 18$^a$ for each information channel to be sensed to allow light to be transmitted from the light source to the light sensitive element over a preselected area, as will be described in more detail hereinafter.

Figures 2, 3, 4:
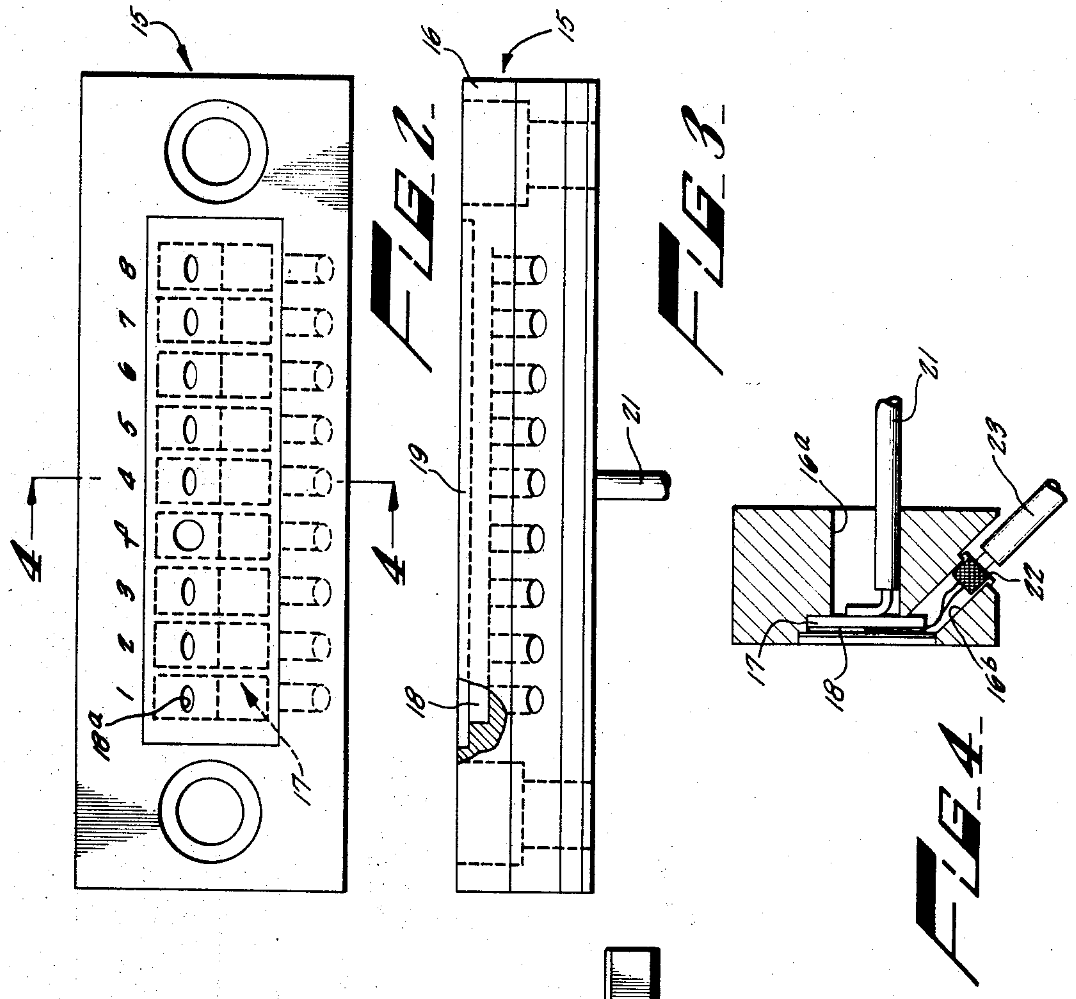
FIG. 2 is a top plan view, with the light transmitting element omitted, of the read out device of the present invention showing the light sensitive elements in dotted outline.
FIG. 3 is a front elevational view, with portions shown in section and in dotted outline, of the read out device.
FIG. 4 is a sectional view of the read out device taken along the line 4—4 of FIG. 2.

A light sensitive element that has been employed in the read out device 15 is a photovoltaic cell that is commercially available from the Hoffman Electronics Corporation of Los Angeles, Calif. and which cell is identified as the Hoffman HPC–9–01 photovoltaic read out cell. Briefly, the read out cell is physically arranged as a single unit with a plurality of isolated sensing elements defined thereon, one for each information channel on the record member and also one for the timing channel. Therefore, when an eight column paper tape is employed as the record member, the photovoltaic cell will have nine sensing elements, one for each information channel and one for the timing channel. Each sensing element is arranged to receive the light transmitted from a corresponding tape channel and is further arranged with a common layer arranged below the separate sensing elements and which layer functions as a common layer or electrode for all of the sensing elements including the timing channel sensing element. The electrical connection to this common layer is shown in FIG. 4 by means of the lead wire 21 connected thereto.

The light sensitive element or photovoltaic cell 17 is mounted in the holder 16 and which holder is constructed of a plastic and is provided with an aperture or socket to accommodate the light sensitive element wherein it is positioned with the light active areas of the individual sensing elements exposed to the light. The holder 16 is preferably constructed of a phenolic material and is further defined with a central aperture 16$^a$ to allow the common lead wire 21 to be passed therethrough and includes a plurality of slots 16$^b$ angularly positioned on the holder 16 to allow the lead wires for the other electrode for each sensing element or the non-common electrodes for the sensing elements to be passed therethrough. These non-common lead wires are arranged on the opposite side of the cell from the common layer thereof. As best seen in FIG. 4, the non-common lead wire for each sensing element is connected to an electrical connector 22 which allows a heavy lead wire, such as the non-common lead wire 23, to be simply pressed into the connector 22 for making the necessary electrical connections to the read out device 15.

The aperture mask 18 includes a non-round aperture 18$^a$ for each information channel, 1–8, on the record member and further includes a round aperture 18$^b$, *f*, that corresponds to the location of the timing aperture on paper tape. The mask 18 is located in the holder 16 over the light sensitive element 17 and in intimate engagement therewith. The apertures provided for the mask 18 are positioned in alignment with the active areas or individual sensing elements of the light sensitive element 17.

An important feature of the present invention is the construction of the aperture mask 18 and the particular configuration of the apertures to provide a usable output indication in response to each recorded aperture on the record member. The construction of the aperture mask 18 and the apertures 18$^a$ is governed by the basic requirements for the output indication from the light sensitive element 17. It is desired to have an output waveform from the element 17 that is substantially square and that preferably has an amplitude that is as large as possible for a given amount of incident illumination. The requirements of amplitude of the output signal and the square waveform requirement cannot both be met with any practical aperture configuration and requires a compromise between these two characteristics. The apertures 18$^a$ are defined whereby the amplitude of the output waveform is at a maximum for approximately fifty percent of the time that a recorded aperture is passing over its corresponding light sensitive element. It should be evident that a very small round aperture would produce an output indication for a longer period than fifty percent but the very size of the aperture restricts the amount of light impinging on the light sensitive element and therefore restricts the magnitude of the output signal that is available from the light sensitive element resulting in an output indication that is not usable.

Referring to FIG. 7 in particular, it will be noted that a portion of a paper tape is illustrated wherein a pair of recorded apertures arranged in the same information column are illustrated in a side-by-side relationship. In a typical commercial application these adjacent recorded apertures have their centers spaced on the order of 0.100 inch and the apertures have diameters on the order of 0.072 inch. The configuration of the non-round aperture 18$^a$ has been defined to increase the exposed active area of the light sensitive element that is exposed to the light over that exposed by a round aperture for example to thereby increase the amplitude of the output signal that is produced from the light sensitive element. Furthermore, the aperture 18$^a$ is further defined with regard to the total time interval that the aperture is presented to the individual area on the light sensitive element to produce a usable signal over a preselected portion of the time interval. In this instance the apertures 18a are defined whereby the active areas of the individual light elements are fully exposed by means of the apertures for approximately fifty percent of the time interval that the aperture is passing over the cell.

Figure 6:
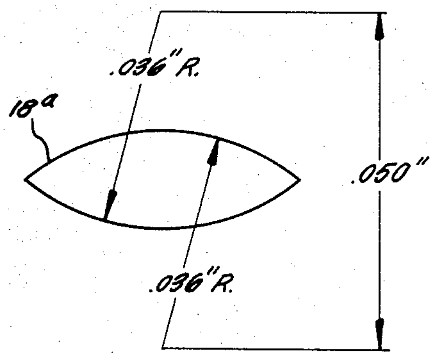
FIG. 6 is an enlarged plan view of one of the non-round apertures of the mask of FIG. 5.

The non-round apertures 18a as illustrated can be considered to be of semi-elliptical or eye-shaped configuration. The area of the aperture 18a is defined by means of the common or overlapping area of two circles having the same diameter as the recorded apertures, 0.072 inch, and whose centers are 0.050 inch apart; see FIG. 6. Accordingly, when such an aperture 18a is positioned in relation to the paper tape as shown in FIG. 7, and the tape is passed from left to right, immediately after the tape moves to the right of the illustrated position the associated light element will not be fully activated and will be considered to be off and will remain off until the succeeding recorded aperture is presented to the same light element. Stated differently, when the recorded aperture is moved to the right of the line "A" as illustrated, the light cell is turned off and will remain off for a time interval corresponding to the time required to travel the 0.050 inch between the lines A and B. When the center line of the aperture 18a coincides with the line B, the cell will be again fully activated and will remain so until it again is positioned at a point corresponding to the line A. It will then be seen that since the distance between the centers of adjacent recorded apertures is 0.100 inch, and the apertures are of the same diameter, the amount of time that the associated light cell is not fully activated corresponds to the dimension 0.050 inch, or one-half of 0.100 inch, that the cells will be fully activated for approximately fifty percent of the time interval that the recorded aperture is passing over the light element. During this interval then the output response from the light sensitive element will be substantially constant and will produce a square topped output waveform which will decrease upon reaching a point corresponding to the line A and again increase to the desired amplitude upon reaching a position corresponding to the line B and thereby provide the desired useful output signal corresponding to the recorded aperture.

It should be noted that when the non-round apertures 18a are of the described semi-elliptical or eye-shaped configuration that the light cell exposure is at a maximum and therefore provides a maximum cell output signal for the above defined recorded aperture, aperture spacing on a fifty percent duty cycle. In addition, it has been found that this aperture shape will also provide an output signal that has a waveform that is more square than the output for any other aperture shape within the above defined parameters including maximum cell exposure.

The aperture plate 18 is constructed of a very thin metallic material and preferably a material that allows the non-round apertures 18a to be readily and accurately located therein. The material selected for the mask 18 may depend upon the ability to chemically mill apertures of a non-round shape and which ability is a direct function of the type and thickness of material selected. It has been found that a metallic sheet of the copper alloy family having a thickness of approximately 0.002 inch is satisfactory since the accuracy of the aperture positions and shapes are better than 0.001 inch when such a material is employed. It has further been found that when the thickness of the material increases the accuracy is reduced due to the tendency of the etching process to under-cut the surface of the material. In one specific embodiment of the invention the mask 18 was constructed of a beryllium copper having a thickness of 0.005 inch.

It should now be appreciated that since a thin mask is employed that the geometry of the mask 18 is such that the effect of a column which is associated with the collimation block no longer exists and, furthermore, the geometry of the mask 18 is such that it does not allow cross talk. In addition, the problems associated with aligning the collimation apertures and the light sensitive element have been eliminated through the mounting of the aperture mask 18 and the light sensitive cell in one block. It will be appreciated, of course, that the location of the non-round apertures 18a on the mask 18 and relative location to one another must be precisely controlled but is facilitated through the selection of a material in the copper alloy family that allows these apertures to be chemically milled.

The construction of the read out device 15 is completed through the provision of a light transmitting element 19 positioned over the mask 18 and which light transmitting element functions as a closure for the aperture or socket of the holder 16. The light transmitting element 19 may be in the form of a glass slide on the order of 0.013 inch that is positioned in intimate engagement with the mask 18 and also has its opposite surface arranged flush with the top surface of the holder 16, as illustrated in FIGS. 3 and 4. The light transmitting element 19 and the aperture mask 18 are preferably held in position by means of epoxy. In the same fashion, the lead wire 21 is held in position by filling the aperture 16a with epoxy, and the connector 22 is similarly secured.

It should now be appreciated that the unitary assembly of the read out device 15 allows the record member or paper tape to ride or pass directly over the assembly.

The read out device 15 of the present invention employing the aforementioned Hoffman photovoltaic cell has been defined to produce an output current of no less than 95 microamperes at 0.2 volt from each information channel and at the same voltage no less than 250 microamperes from the feed holes of a tape when the tape is illuminated from a light source of 100 milliwatts per square centimeter at a color temperature of 2,800 degrees Kelvin.

It should be recognized that although the aperture 18b is illustrated as a round aperture for sensing the feed hole because of the different circuit requirements, it too may be defined as a non-round aperture 18a.

It should now be evident that one of the most important features of the invention is the configuration of the apertures of the aperture mask. To this end, it will be recalled once again that the aperture is defined relative to the production of a maximum output signal having a substantially square waveform for a preselected duty cycle. The importance of the semi-elliptical or eye-shaped configuration can be better appreciated when a different duty cycle is considered wherein the light sensitive element is activated for only forty per cent of the time interval a recorded aperture is passing over the light sensitive element. This same general aperture shape would be utilized for the same general specifications for the record member except that now the distance between the center of a pair of apertures recorded side-by-side as in FIG. 7 and the lines A and B are 0.020 inch. With a center-to-center spacing of these apertures of 0.100 inch, then the distance between the lines A and B is now 0.060 inch rather than 0.050 inch to provide a forty percent "on time." The non-round aperture 18a is defined in the same general fashion through the intersection of a pair of overlapping circles but to place the line A at the desired distance from the center of a recorded aperture.

What is claimed is:

1. A sensing element comprising a light sensitive member for producing electrical output indications in response to a light signal impinging thereon, a holder having a socket for mounting the light sensitive member to expose one side thereof to light, a mask having an eye-shaped light transmitting aperture for exposing the corresponding light exposed portion of the light sensitive member and mounted in the holder socket over the light sensitive member, and a light transmitting member mounted in the holder over the mask to function as a closure for the socket to thereby define a unitary sensing assembly.

2. A read out device for sensing light transmitting apertures in a record member and providing output indications thereof comprising a light sensitive member comprising a plurality of elements for individually producing electrical output indications in response to a light signal impinging thereon, said elements each being arranged to receive light from individual areas of a record member, a holder having an aperture for mounting the light sensitive member to expose the individual elements to light, a mask having individual light transmitting semi-elliptical apertures for exposing preselected portions of the light exposed portions of corresponding light sensitive elements and being mounted in the holder aperture over the light sensitive member, said light transmitting apertures being defined to expose a light element a preselected portion of the time a recorded aperture is passed over an element, and a light transmitting member mounted in the holder aperture over the mask to function as a closure for the holder aperture.

3. A read out device for sensing light transmitting apertures in a record member and providing output indications thereof comprising a photovoltaic cell comprising a plurality of individual elements for individually producing electrical output indications in response to a light signal impinging on an element of said cell, said elements each being arranged to receive light from individual areas of a record member, a holder having an aperture for mounting said cell to expose the individual elements to light, a mask having individual semi-elliptical light transmitting apertures for exposing preselected portions of the light exposed portions of the corresponding elements and being mounted in the holder aperture with said cell, said light transmitting apertures being defined to expose a light element a preselected portion of the time a recorded aperture is passed over an element to cause the individual elements to produce a substantially square output waveform of a preselected amplitude as a function of the motion of the record member, and a relatively thin light transmitting member mounted in the holder aperture in contact with the mask and functioning as a closure for the holder aperture to thereby define a unitary read out device.

4. A read out device for sensing recorded light transmitting apertures in a record member and providing output indications thereof comprising a light sensitive element, a holder for mounting the light element with its light active area exposed to the light, a metallic sheet having a semi-elliptical aperture mounted over the active element for exposing a preselected portion of the active area of the light element to allow the cell to be fully activated a preselected portion of the time a recorded light transmitting aperture of a record member is positioned over the light element, and a light transmitting member mounted over the metallic sheet and in engagement therewith and in the holder to function as a closure for the holder aperture to thereby define a unitary assembly whereby a record member to be read may be passed over the light transmitting member.

5. A readout device for sensing light transmitting apertures in a record member as defined in claim 4 wherein the metallic sheet is a beryllium copper sheet and the light transmitting member comprises glass.

6. A read out device for sensing light transmitting apertures in a record member as defined in claim 5 wherein the semi-elliptical aperture of the copper sheet is substantially eye-shaped to allow the light element to be fully exposed approximately fifty percent of the time interval a recorded light transmitting aperture is passed over the light element.

7. In a record reader having a light source comprising a single filament lamp, a cylindrical lens, a record sensing element spaced from said lens, said sensing element comprising a light sensitive member comprising a plurality of individual light active elements for individually producing electrical output indications in response to a light signal impinging on an element, said elements each being arranged to receive light from individual areas of a record member positioned between said lens and said sensing element, a holder having an aperture for mounting the light sensitive member to expose the individual elements to light, a mask having individual light transmitting semi-elliptical apertures for exposing preselected portions of the light exposed portions of corresponding light sensitive elements and being mounted in the holder aperture over the light sensitive member, said light transmitting apertures being defined to expose a light element a preselected portion of the time a recorded aperture is passed over an element, and a light transmitting member mounted in the holder aperture over the mask to form a unitary sensing assembly and allow a record member to be passed over the member.

References Cited

UNITED STATES PATENTS

| | | | |
|---|---|---|---|
| 1,337,737 | 4/1920 | Van der Bijl | 250—233 |
| 2,586,609 | 2/1952 | Burke | 250—219 X |
| 2,939,016 | 5/1960 | Cannon | 250—219 |
| 3,225,176 | 12/1965 | Jones | 250—219 |
| 3,268,735 | 8/1966 | Beeh | 250—233 |

WALTER STOLWEIN, *Primary Examiner.*